United States Patent [19]

Morii et al.

[11] Patent Number: 5,007,582

[45] Date of Patent: Apr. 16, 1991

[54] REDUCED PRESSURE STEAM HEAT TREATING DEVICE

[75] Inventors: Takayuki Morii, Kako; Hideaki Yumoto, Kakogawa, both of Japan

[73] Assignee: TLV Company, Limited, Kakogawa, Japan

[21] Appl. No.: 439,944

[22] Filed: Nov. 22, 1989

[51] Int. Cl.$^5$ ............................................. F24F 11/00
[52] U.S. Cl. ...................................... 236/40; 236/41; 237/67
[58] Field of Search .................... 237/9 R, 67, 59; 236/40, 38, 41

[56] References Cited

U.S. PATENT DOCUMENTS 4,477,021 10/1984 Balz ....................................... 237/67

Primary Examiner—Henry A. Bennett
Attorney, Agent, or Firm—Morris Fidelman; Franklin D. Wolffe

[57] ABSTRACT

A device for heating with reduced pressure steam directly or indirectly a material or product to be heat-treated, which includes a heat exchanger chamber which is supplied with steam through a pressure reducing valve and evacuated by an ejector device which can control the heating temperature of the heat exchanger chamber by controlling the operation fluid of the ejector device. The device can be used safely and advantageously in chemical and food industries.

13 Claims, 3 Drawing Sheets

5,007,582

REDUCED PRESSURE STEAM HEAT TREATING DEVICE

BACKGROUND OF INVENTION

This invention relates to a heat-treating device for safely and efficiently heat-treating product to be treated at relatively low temperature such as lower than 100° C. with reduced pressure steam and/or water as heat medium.

In the field of chemical and food industries, materials are frequently treated at relatively low temperature lower than 100° C., for example, in order to maintaining safe operation and product quality. For such heat-treatment, such a device as disclosed, for example, in the Japanese patent opening gazette No. 60-64108, which uses reduced pressure steam as heat medium, has been used. In this device, steam is supplied from a steam source through a pressure reducing valve to a heat exchanger chamber having an outlet connected to a conventional vacuum pump through a steam trap which is bypassed for enabling flow-rate control of the fluid path. However, the conventional vacuum pump is operated always to attain its ultimate vacuum pressure, so that the steam is excessively sucked by the pump to give an undesirably high degree of vacuum to the heat exchager chamber. In order to prevent such a trouble, the flow-rate of the above-mentioned bypass may be increased for maintaining the pressure within the heat exchanger chamber. As a result, however, a lot of steam is exhausted through the bypass to result not only in an excessive loss of steam but also in an unstable pressure within the heat exchanger chamber.

Accordingly, an object of this invention is to provide an improved reduced pressure steam heat treating device which exhibits a steady steam pressure in the heat exchanger chamber and a high thermal efficiency.

Another object of this invention is to provide a convenient heat-treating device which can effect alternating heating and cooling operations as occasion demands.

SUMMARY OF INVENTION

According to this invention, there is provided a reduced pressure steam heat-treating device which comprises a heat exchanger chamber having an inlet connected to a steam source through a pressure reducing valve, an ejector connected to the outlet of the heat exchanger chamber and means for controlling the temperature of fluid passing the jetting nozzle of the ejector, and enabling to arbitrarily setting the suction pressure of the ejector by controlling the fluid temperature.

According to another aspect of this invention, the reduced pressure steam heat-treating device further comprises a pump for feeding the fluid to the ejector, a tank for supplying the fluid to the pump and receiving the fluid discharged from the diffuser of the ejector and means for selectively connecting the outlet of the pump to the inlet of the heat exchanger chamber and, at the same time, disconnecting the steam supply from the heat exchanger chamber to enable cooling operation with the same fluid.

These and other objects and features of this invention will be described in detail below about its embodiments with reference to the accompanying drawings.

BRIEF DESCRIPTION OF DRAWINGS

In the drawings.

Throughout the drawings, same reference numerals are given to corresponding structural components which will not be described separately.

DESCRIPTION OF PREFERRED EMBODIMENTS

Figure 1:
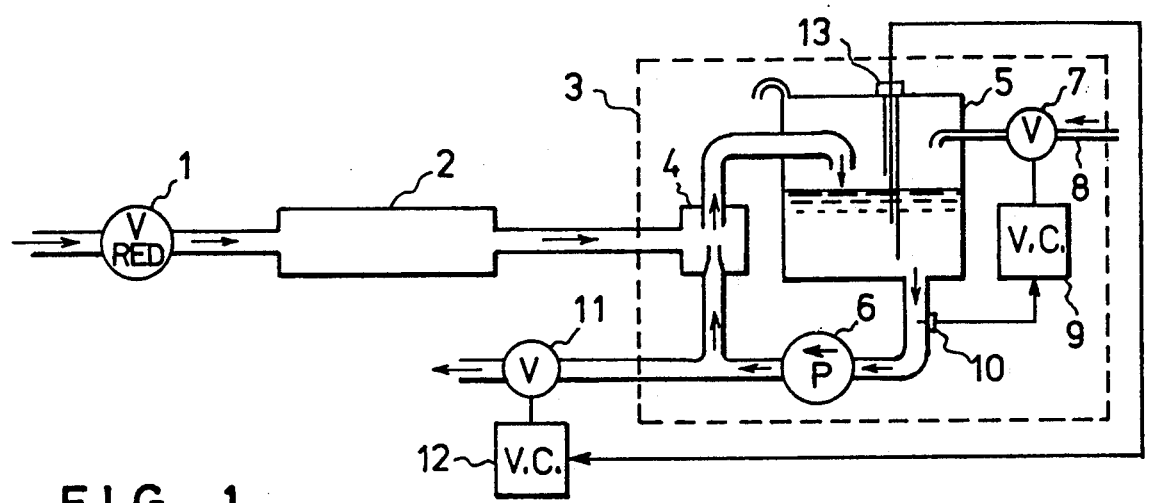
FIG. 1 is a schematic diagram representing a configuration of a first embodiment of the heat-treating device according to this invention.

Referring to FIG. 1, steam supplied from a suitable steam generator (not shown) passes a pressure reducing valve 1 a heat exchanger chamber 2 which will be described later. The heat exchanger chamber 2 is connected to an ejector device 3. The ejector device 3 includes an ejector 4 having a suction chamber connected to the heat exchanger chamber 2, a storage tank 5 of operation fluid (e.g., water) for the ejector, and a conventional volute pump 6 for feeding the fluid in the tank to the nozzle of the ejector 4 and returning it through its defuser to the tank 5. The tank 5 is provided with a water feeding pipe 8 having an electrically driven valve 7 and a valve control unit 9 for driving the valve 7 is adapted to respond to a temperature signal from a temperature sensor 10 disposed in the piping between the tank 5 and the pump 6. Another electrically driven valve 11 connected to the exterior is disposed between the pump 6 and the ejector 4 and a valve control unit 12 for driving this valve is adapted to respond to a detection signal from a level detector 13 disposed in the tank 5.

In operation, the water in the tank 5 is forcibly fed to the ejector 4 by the pump 6 and returns again to the tank 5 to recirculate. Then, a saturation pressure corresponding to the current water temperature is produced in the ejector 4 and the pressure within the heat exchanger 2 is reduced thereby. The water termperature is constantly monitored by the temperature sensor 10 and, if it exceeds a predetermined value, the electricallY driven valve 7 is opened by the valve control unit 9 to replenish cool water from the feeding pipe 8 for reducing the water temperature. Accordingly, the pressure within the heat exchanger chamber 2 is automatically maintained at a predetermined value by suitably presetting the actuation temperature of the valve control unit 9. While the water level within the tank 5 is raised by the replenishment of water, it is constantly monitored by the level detector 13 and, if it exceeds a predetermined upper limit, the electrically controlled valve 11 is opened by the valve control unit 12 to discharge the excessive water to the exterior. The valve 11 is closed when the level reaches a predetermined lower limit. Thus, the steam pressure within the heat exchanger chamber 2 is maintained at a predetermined reduced value in the device of this invention and never becomes an excessive vacuum as in the prior art devices.

Figure 2:
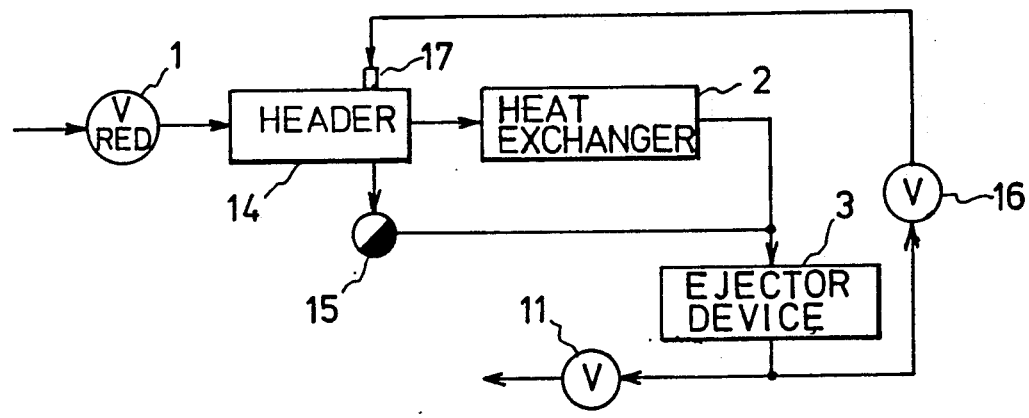
FIG. 2 is a block diagram representing a variation of the embodiment of FIG. 1.
Figure 3:
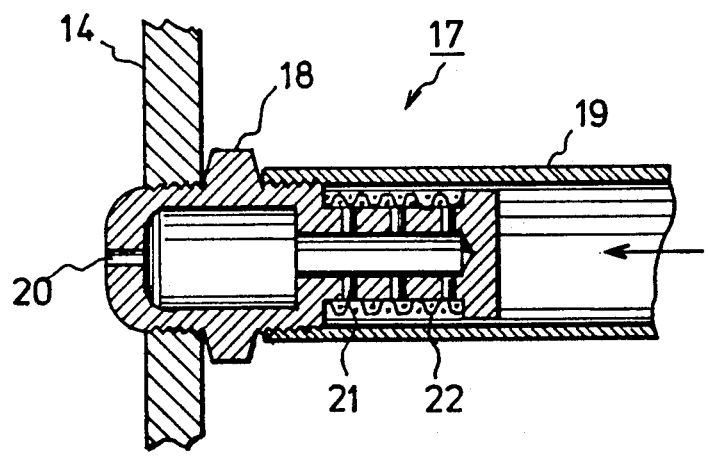
FIG. 3 is a sectrional view representing a main portion of a header used in the variation of FIG. 2.

As described above, the pressure within the heat exchanger chamber 2 is expected to become a saturation vapor pressure of the operation fluid and the temperature of the heating steam fed through the pressure reducing valve 1 is expected to become a saturation pressure corresponding to this pressure. However, a high pressure steam has a general tendency of becoming a superheated steam when reduced in pressure by a pressure reducing valve and the temperature within the heat exchanger chamber 2 may become higher than an expected temperature. In order to suppress such superheating, as shown in FIG. 2, a header chamber 14 is disposed between the pressure reducing valve 1 and the heat exchanger chamber 2, the bottom of the header chamber 14 is connected through a steam trap 15 to the suction chamber of the ejector 4 and the inlet side of the electrically driven valve 11 is connected through a valve 16 to a temperature dumper 17 attached to the side wall of the header chamber 14. As shown in FIG. 3, the teperature dumper 17 includes a hollow head portion 18 screwed in the side wall of the header chamber 14 and a pipe joint 19 coupled thereto and the head portion 18 has a through-hole 20 opening in the header chamber 14 at the top and a rear portion connected to the interior of the pipe coupling 19 through side openings 21 and a screen 22. With this arrangement, drain collected by the steam trap 15 from the header chamber 14 is sucked by the ejector device 3 and, when the valve 16 is opened, the water at its saturation temperature is forcedly fed by the pump 6 to the temperature dumper 17 and sprayed from the through-hole 20 into the header chamber 14. Thus, the superheated steam is reduced in temperature and the sprayed water becomes a saturated water vapor. The vapor pressure within the heat exchanger chamber 2 can be maintained constantly at a saturated vapor pressure by controlling the valve 16 to adjust the amount of spray.

Figure 4:
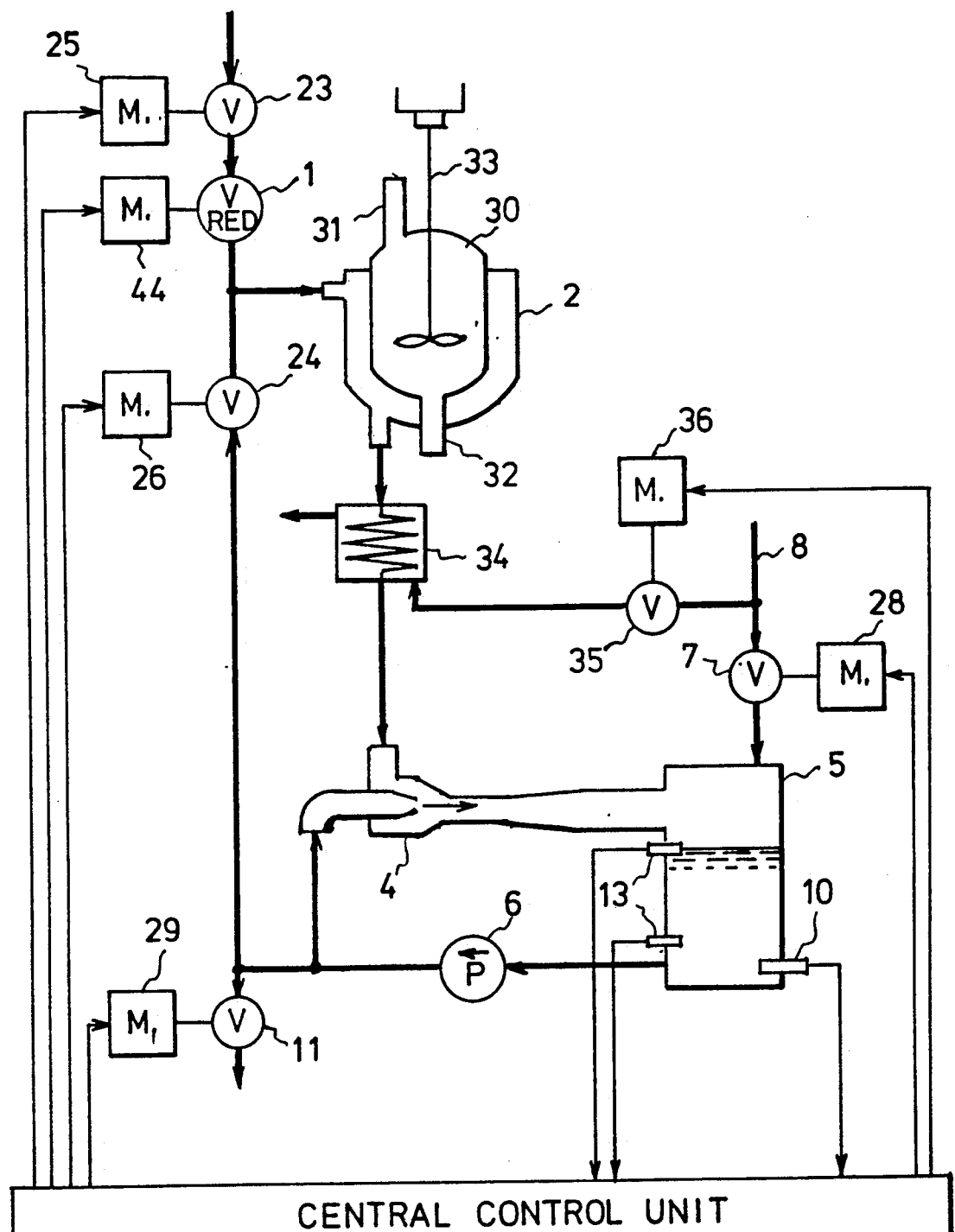
FIG. 4 is a schematic diagram, partly in block form, representing a configuration of a second embodiment of the heat-treating device according to this invention.

Referring next to FIG. 4, the ejector device of this embodiment also includes an ejector 4, a tank 5, a pump 6, a feed valve 7, a feed pipe 8 and a discharge valve 11 and the tank 5 is provided with a temperature sensor 10 and a level detector 13, as in the embodiment of FIG. 1. In this embodiment, however, an electrically driven valve 23 is disposed before the pressure reducing valve 1 and the outlet side of the pump 6 is connected through an electrically driven valve 24 to the outlet side of the pressure reducing valve 1, namely, the inlet of the heat exchanger chamber 2. Motors or electromagnets 25 and 26 for driving the valves 23 and 24 are connected to a central control device 27 to open and close the valves 23 and 24 in mutually opposing fashion under control thereof. Motors or electromagnets 28 and 29 for driving the valves 7 and 11 are also connected to the central control device 27 and adapted to effect the same operation as in the embodiment of FIG. 1 based upon the signals from the temperature sensor 10 and the level detector 13. As shown, the heat exchanger chamber 2 of this embodiment has a U-shaped vertical section and is put in contact with a cylindrical reaction chamber 30 which is provided with a material inlet 31, a product outlet 32 and a stirrer 33. A condenser 34 is inserted between the outlet of the heat exchanger chamber 2 and the ejector 4 and the cooling water for the condenser 34 is fed from the feed pipe 8 through an electrically driven valve 35 and discharged to the exterior. A driving motor or electromagnet 36 for this valve is also connected to the central control device 27.

When the valve 24 is closed and the valve 23 is opened in this arrangement, steam from a steam source (not shown) enters the heat exchanger chamber 2 through the pressure reducing valve 1 and, after heating the reaction chamber 30 which is in contact with the heat exchanger chamber 2 and reaction as in the embodiment of FIG. 1, it is condensed by the condenser 34 and sucked by the ejector 4 to enter the tank 5, thereby raising the water temperature therein. However, the condenser 34 need not be used in such a heating operation as in the embodiment of FIG. 1.

If the valve 23 is then closed and the valve 24 is opened, the steam supply to the heat exchanger chamber 2 stops and, at the same time, the warm water in the tank 5 is forcibly fed to the heat exchanger chamber 2 by the pump 6. This water and the residual steam are sucked by the ejector 4 to return to the tank 5. At the same time, the feed valve 7 is opened to replenish the tank 5 with water to gradually lower the water temperature of the tank 5. While the water fed into the heat exchanger chamber 2 is evaporated by the heat of the reaction chamber 30 to cool the reaction chamber 30 by its heat of evaporation, a lot of vapor produced at this time is condensed by the condenser 34 and sucked by the ejector 4. Thus, the condenser 34 serves to suppress the overload upon the sucking operation of the ejector 4. If cool water is fed in the heat exchanger chamber 2 as in the prior art devices, the residual steam therein is quickly condenced to cause sudden change of the pressure and so-called hammer effect which may induce vibration and destruction of the device. In the device of this invention, however, there is no quick condensation of the residual steam and, therefore, no hammer effect is induced since the water temperature of the tank 5 just after the heating operation is substantially high. The temperature of the heat exchanger chamber 2 lowers gradually with reduction of the water temperature of the tank 5. If this water temperature is suitably preset in the control device 27, the negative pressure of the ejector 4 is accordingly controlled and the cooling speed is thereby controlled to enable a desired cooling treatment.

When the heating operation is resumed after the cooling operation, the feed valve 7 is closed first. Then, the water in the tank 5 circulates through the pump 6, valve 24, heat exchanger chamber 2, condenser 34 and ejector 4 and absorbs heat from the reaction chamber 30 to gradually raise its temperature. When it reaches a suitable temperature, the valve 26 is closed and the valve 23 is opened at the same time to introduce the steam. In this manner, the heating operation can be resumed without the hammer effect attributable to sudden change of the temperature.

The above-mentioned adjustment of the water temperature and control of the valves can be stored previously as a predetermined program in the control device 27, thereby enabling complete automation of the heating and cooling operations.

Figure 5:
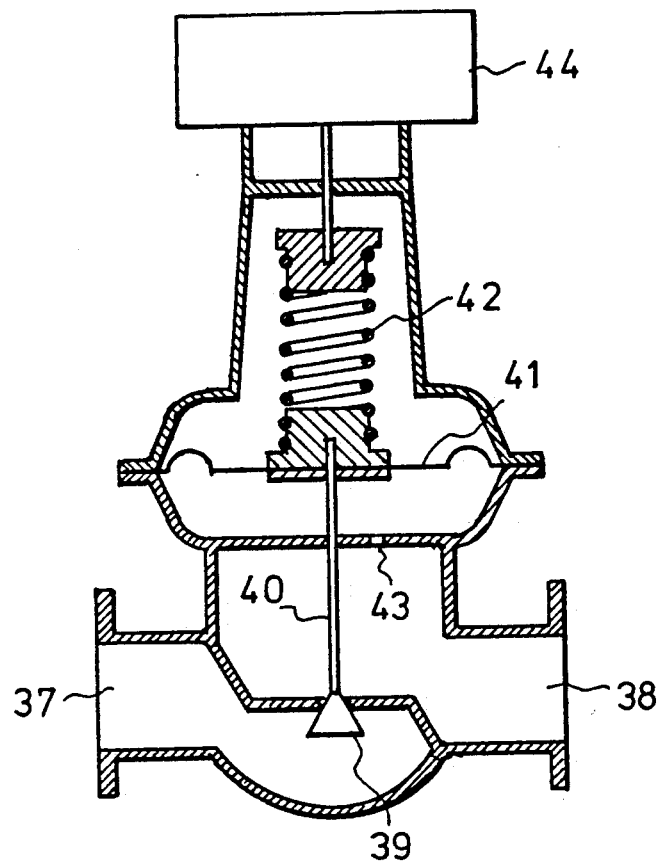
FIG. 5 is a schematic sectional view representing a structure of the pressure reducing valve used in the device of this invention.

While the heat-treating device of this invention is particularly effective when used in the case of normal heating temperature below 100° C. such as in various reaction chambers and food distilling, condensing and sterilizing devices, a structure of the pressure reducing valve 1 used in this case is schematically shown in FIG. 5. As shown, the pressure reducing valve 1 has a steam inlet 37 and a steam outlet 38 and includes a main valve 39 therebetween. The main valve 39 is coupled to a pressure responsive diaphragm 41 through a connecting rod 40 and pulled up with the diaphragm 41 by a spring 42 to close the steam path, contrary to the conventional pressure reducing valve. The lower cavity of the diaphragm 41 is connected to the outlet side through an opening 43 to have the secondary pressure. Accordingly, when the secondary pressure, namely, the pressure of the heat exchanger chamber 2 lowers to some extent, the diaphragm 41 is pulled down against the spring 42 to open the main valve 39 to feed the steam to the heat exchanger chamber 2. When the secondary pressure is restored, the diaphragm 41 is pulled up to close the main valve 39. The tension of the spring 42 can be adjusted by a tension control 44. The tension control 44 may include, for example, an adjusting motor and operate in response to a signal from the control device 27 as shown in FIG. 4. When the above-mentioned heating temperature is above 100° C., a pressure reducing valve of the conventional structure is used since the secondary saturated vapor pressure becomes above atmospheric pressure. In this case, the main valve 39 is pushed down by the spring 42 and normally opens, while it is closed when the secondary pressure becomes above a predetermined value.

Figure 6:
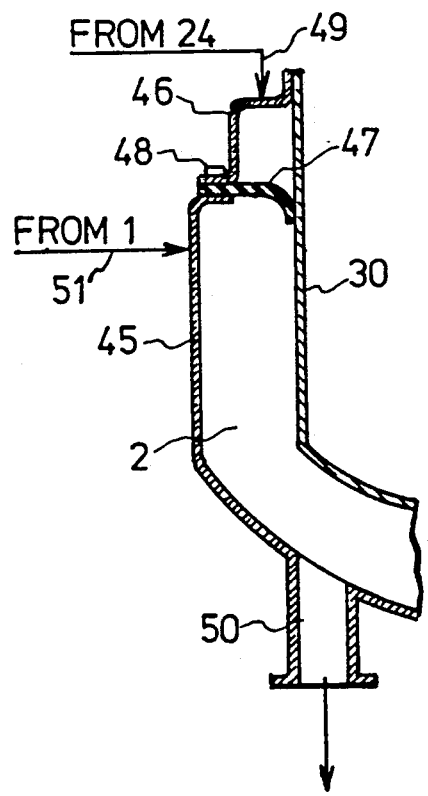
FIG. 6 is a sectional view representing a partial structure of the heat exchanger chamber used in the embodiment of FIG. 4.

In the heat exchanger chamber 2 of the embodiment of FIG. 4, when the cooling water is introduced therein from the valve 24 through the path which is common to the steam heating operation as described above, much thereof is insufficiently contacted with the surface of the reaction chamber 30 and sucked by the ejector 4 before evaporation, thereby resulting in a low cooling efficiency. FIG. 6 shows an improved structure for removing this trouble. As shown, the reaction chamber 30 is surrounded by the heat exchanger chamber 2 having an outer wall 45. The heat exchanger chamber 2 has an annular cover 46 which is coupled by bolts 48 with an annular rubber plate 47 intervening therebetween. The inner diameter of the rubber plate 47 is a little smaller than the outer diameter of the reaction chamber 30 and, therefore, its inner peripheral portion is bent downwards along the outer wall of the reaction chamber 30 as shown. When the cooling water is introduced from the valve 24 into the cavity above the rubber plate 47 as schematically shown by an arrow 49, it deforms the rubber plate 47 by its pressure and flows down through the gap between the outer wall of the reaction chamber 30 and the rubber plate 47 along that outer wall and, finally, it is sucked and discharged from the lower outlet 50. The thus fed cooling water is effectively evaporated by the heat of the reaction chamber 30 and the reaction chamber 30 can be efficiently cooled by the resultant heat of evaporation. In the case of this structure, the heating steam is introduced from the pressure reducing valve 1 through another piping separate from the cooling water into the underside of the rubber plate 47 as schematically shown by an arrow 51. The rubber plate 47 may be made of a suitable resilient material other than rubber.

As described above, this invention provides a reduced pressure steam heat treating device having high stability and high thermal effciency. The above-mentioned embodiments have been proposed for illustrative purpose only. It should be understood by those skilled in the art that various modifications and changes of these embodiments can be made without leaving the spirit and scope of the invention as defined in the apended claims. For example, while a U-shaped section of the heat exchanger chamber 2 surrounding the reaction chamber 30 is shown in the above embodiment, the structure and shape of the heat exchanger chamber 2 is freely selectable and, if necessary, the material to be treated may be inserted directly in the heat exchanger chamber 2. While all valves are illustrated as controlled automatically in FIG. 4, any one or more of them may be manually controlled. If the pressure reducing valve 1 of FIG. 4 is adapted to enable its complete closure, the preceding valve 23 may be removed Moreover, some of those components other than the pressure reducing valve, heat exchanger chamber and ejector device may be optionally removed in accordance with the use and operational condition of the device.

What is claimed is:

1. A reduced pressure steam heat treating device as comprising a pressure reducing valve having an inlet connected to a steam source and an outlet, a heat exchanger chamber having an inlet connected to the outlet of said pressure reducing valve and an outlet, an ejector having a suction chamber connected to the outlet of said heat exchanger chamber, means for feeding operation fluid to said ejector, and means for controlling the temperature of said operation fluid to control the sucking pressure of said ejector, wherein said operation fluid feeding means comprises a fluid storage tank, pumping means for forcedly feeding the operation fluid in said storage than to a jetting nozzle of said ejector, means for returning said operation fluid from said ejector to said storage tank, and means for replenishing said fluid storage tank with operation fluid of relatively low temperature.

2. A device as set forth in claim 1, wherein said means for controlling the temperature of the operation fluid includes a temperature sensor for sensing the temperature of said operation fluid to provide a sense signal, and means responsive to said sense signal for controlling the amount of replenishment of said replenishing means.

3. A device as set forth in claim 1, wherein said device further comprises means for detecting the level of said operation fluid storage tank to provide a detection signal, and means responsive to said detection signal for discharging said operation fluid to the exterior.

4. A device as set forth in claim 1, wherein the device further comprises overheated vapor saturating means inserted between said pressure reducing valve and said heat exchanger chamber, said means includes a tightly closed cavity and means for spraying said operation fluid into said cavity.

5. A reduced pressure steam heat treating device comprising a pressure reducing valve connected to a steam source, a heat exchanger chamber connected to said pressure reducing valve, an ejector having a suction chamber connected to said heat exchanger chamber, a storage tank for operation fluid for said ejector, means including a pump for forcedly feeding said operation fluid from said storage tank to a jetting nozzle of said ejector, means for returning said operation fluid from said ejector to said storage tank, means for replenishing said storage tank with operation fluid, means for sensing the temperature of the operation fluid in said storage tank and controlling the replenishment of said operation fluid based thereupon, and means for detecting the level of the operation fluid in said storage tank and discharging said operation fluid to the exterior based thereupon.

6. A reduced pressure steam heat treating device comprising a pressure reducing valve having an inlet connected to a steam source and an outlet, a heat exchanger chamber having an inlet connected to the outlet of said pressure reducing valve and an outlet, an ejector having a suction chamber connected to the outlet of said heat exchanger chamber, means for feeding operation fluid to said ejector, means for introducing said operation fluid to the inlet of said heat exchanger chamber, means for switching feed of said steam and said operation fluid to said heat exchanger chamber, means for controlling the temperature of said operation fluid, and said device being adapted to control the temperature of said operation fluid for controlling the sucking pressure of said ejector.

7. A device as set forth in claim 6, wherein said operation fluid feeding device comprises a fluid storage tank, pumping means for forcedly feeding the operation fluid in said storage tank to a jetting nozzle of said ejector, means for returing the operation fluid from said ejector, and means for replenishing said fluid storage tank with operation fluid of relatively low temperature.

8. A device as set forth in claim 7, wherein said means for controlling the temperature of the operation fluid includes means for sensing the temperature of said operation fluid to provide a sense signal, and means responsive to said sense signal for controlling the amount of replenishment of said replenishing means.

9. A device as set forth in claim 7, wherein said device further comprises means for detecting the level of said fluid storage tank to provide a detection signal, and means responsive to said detection signal for discharging said operation fluid to the exterior.

10. A device as set forth in claim 6, wherein said pressure reducing valve includes a main valve normally urged to the direction of closure, and pressure responsive means for responding to pressure reduction of the outlet side to open said main valve.

11. A device as set forth in claim 6, wherein a condenser device is provided in the piping between said heat exchanger chamber and said ejector.

12. A device as set forth in claim 6, wherein said heat exchanger chamber has a U-shaped section surrounding a cylindrical reaction chamber and an internal cavity divided by an annular partition plate into an upper cavity having a relatively small volume and a lower cavity having a relatively large volume, said partition plate is composed of a resilient material having an inner diameter less than the outer diameter of said reaction chamber, the inner peripheral portion of said partition plate is bent along the outer wall of said reaction chamber, said upper cavity has an inlet for said operation fluid, and said lower cavity has an inlet for said steam and an outlet common to both said fluid and steam.

13. A reduced pressure steam heat treating device comprising a pressure reducing valve connected to a steam source, a heat exchanger chamber connected to said pressure reducing valve, a condenser device connected to said heat exchanger chamber, an ejector having a suction chamber connected to said condenser device, a storage tank for operation fluid for the ejector, means including a pump for forcedly feeding said operation fluid from said storage tank to a jetting nozzle of said ejector, means for returning said operation fluid from said ejector to said storage tank, means for introducing said operation fluid from said pump to said heat exchanger chamber, means for switching feed of said steam and said operation fluid to said heat exchanger chamber, means for replenishing said storage tank with operation fluid, means for sensing the temperature of the operation fluid in said storage tank to control the amount of replenishment of said operation fluid based thereupon, and means for detecting the level of the operation fluid in said storage tank to discharge said operation fluid to the exterior based thereupon.

* * * * *